Dec. 12, 1939.   R. H. GODDARD   2,183,313
COMBUSTION CHAMBER FOR AIRCRAFT
Filed July 7, 1938    2 Sheets—Sheet 1
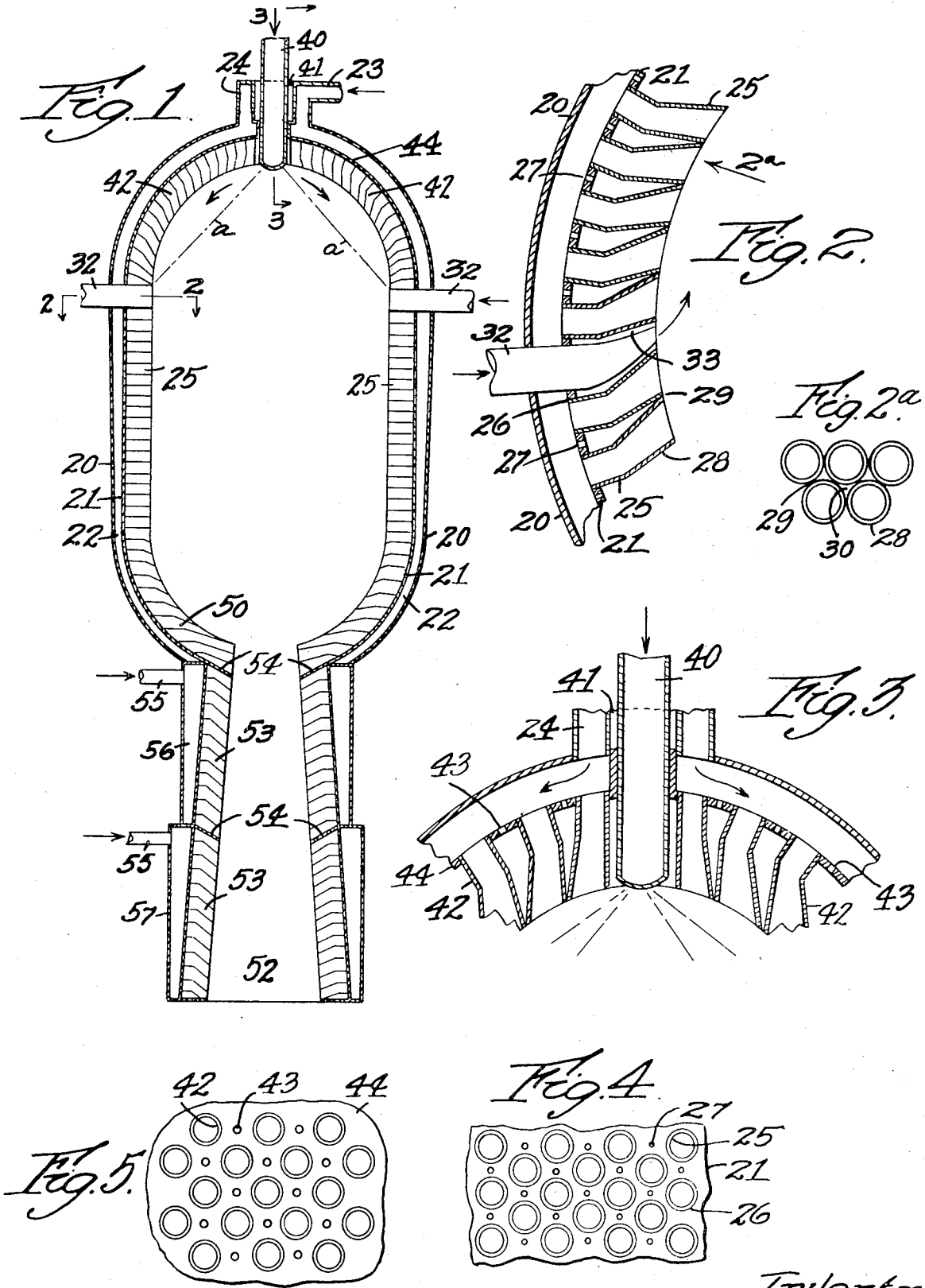
Inventor
Robert H. Goddard
By Attorney
Chas. A. Hawley Dec. 12, 1939.     R. H. GODDARD     2,183,313
COMBUSTION CHAMBER FOR AIRCRAFT
Filed July 7, 1938     2 Sheets-Sheet 2

Inventor
Robert H. Goddard
By attorney

Patented Dec. 12, 1939

2,183,313

UNITED STATES PATENT OFFICE 2,183,313

COMBUSTION CHAMBER FOR AIRCRAFT

Robert H. Goddard, Roswell, N. Mex.

Application July 7, 1938, Serial No. 217,962

18 Claims. (Cl. 60—35.6)

This invention relates to a combustion chamber particularly designed for use in rockets, rocket planes and other aircraft in which continuous combustion of liquid constituents takes place at very high temperature. Effective provision for cooling the walls of such combustion chambers without substantial addition of weight is thus very important.

It is the general object of my invention to provide an improved construction in light-weight combustion chambers, such that the chamber wall is effectively cooled; that one of the liquid constituents is simultaneously vaporized, with absorption of latent heat; and that the two combustion constituents are intimately mixed adjacent the chamber wall.

A further object is to provide a combustion chamber of relatively light weight which is well adapted to resist external pressure.

My invention further relates to arrangements and combinations of parts which will be hereinafter described and more particularly pointed out in the appended claims.

A preferred form of the invention and certain modifications thereof are shown in the drawings, in which Fig. 1 is a sectional front elevation of a combustion chamber embodying my improvements;

Fig. 2 is an enlarged partial sectional plan view, taken along the line 2—2 of Fig. 1;

Fig. 2$^a$ is a detail view, looking in the direction of the arrow 2$^a$ in Fig. 2;

Fig. 3 is an enlarged partial sectional elevation, taken along the line 3—3 in Fig. 1;

Figs. 4 and 5 are detail views to be described;

As previously stated, the general object of the invention is to provide a construction in combustion chamber walls such that the chamber may combine light weight with sufficient strength to resist the pressures required or developed in operation.

In carrying out my invention, I provide a chamber wall of such construction that the liquid oxygen supplied to support combustion may expand and vaporize as it passes through the wall and along its inner surface, thus cooling the wall by reason of the absorption of a large amount of latent heat during vaporization. In this manner the temperatures in and adjacent the chamber wall are kept under such control that the very high temperatures within the combustion chamber will not destroy said chamber.

Figure 6:
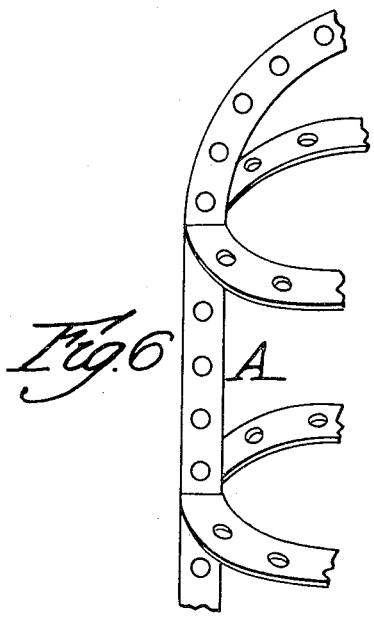
Fig. 6 is a partial perspective view of certain reenforcing structure.

In the construction shown in Figs. 1 and 2, my improved combustion chamber wall comprises an outer casing 20 and an inner casing 21, separated by an annular space 22 to which liquid oxygen is delivered through a pipe 23 and annular intake 24. The outer casing 20 of the combustion chamber may be constructed and reenforced as described in my prior Patent No. 2,109,529, and the inner and outer casings may be spaced apart by the perforated reenforcing structure A shown in Fig. 6.

A multiplicity of small tubes 25 (Fig. 2) are mounted in holes 26 in the inner casing 21, and small holes or openings 27 are provided in the spaces between the holes 26. The tubes 25 are preferably welded or riveted or otherwise permanently secured to the casing 21, and the portions of the tubes 25 adjacent the casing 21 are preferably cylindrical and radially disposed. The inner portions 28 of the tubes 25 are inwardly expanded to such size that the inner ends of the tubes are in contact. The tubes are preferably welded or otherwise secured to each other at these points of contact, as indicated at 29 in Figs. 2 and 2$^a$.

The holes 27 (Figs. 2 and 4) between the tubes 25 communicate with the combustion chamber through the spaces 30 (Fig. 2$^a$) between the inner ends of the enlarged portions 28 of the tubes 25.

The areas of the spaces 30 preferably bear the same relation to the areas of the holes 27 that the areas of the inner ends of the tubes 28 bear to the areas of the cylindrical portions 25. In each case, the opening at the inner surface of the chamber wall is substantially greater than the corresponding opening in the casing 21, to allow for expansion and at least partial vaporization of the liquid oxygen.

The second liquid constituent necessary for combustion, such as gasoline, is supplied to the combustion chamber through inlet tubes or nozzles 32, which are curved at their inner ends so that the gasoline is given a circumferential movement along the inner face of the combustion chamber, as described in my prior Patents Nos. 2,016,921 and 2,085,800.

An annular space 33 is preferably provided around the inlet tubes or nozzles 32 to prevent freezing of the gasoline by contact of the nozzles with the tubes 25, which are much cooled by the liquid air therein.

It should also be noted that the inner portions 28 of the tubes 25 are offset or displaced circumferentially in the direction of flow of the gasoline leaving the nozzles 32. This offsetting of the tubes in the direction of flow facilitates the entrance of the oxygen into the flow of gasoline and prevents choking of the tubes. The gasoline and oxygen, while moving in the same direction, are traveling at very different speeds with the gasoline traveling more rapidly. Effective mixing of the two elements and combustion thereof takes place along the inner surface of the combustion chamber wall.

The hemispherical end of the combustion chamber is supplied with gasoline through an axially disposed spray nozzle 40 (Figs. 1 and 3) which delivers the spray in the form of an open cone in the space outside of the lines a in Fig. 1. A clearance space 41 is provided between the nozzle 40 and the annular oxygen intake 24 to prevent freezing, as previously described.

The tubes 42 and openings 43 in the hemispherical inner end casing 44 are similar to the tubes 25 and openings 27 previously described, but the inner ends of the tubes 42 are offset downwardly at increasing angles as indicated in Figs. 1 and 3, this being also in the direction of flow of the gasoline spray from the nozzle 40.

The relative spacing of the tubes 42 and openings 43 in the end casing 44 will be symmetrical in all directions in the hemispherical section, as indicated in Fig. 5, but in the cylindrical middle portion of the chamber the arrangement of the tubes 25 and openings 27 may be as shown in Fig. 4, as the tubes in this middle section inwardly converge horizontally toward the axis of the chamber but maintain uniform spacing vertically.

In the lower portion of the combustion chamber, the tubes 50 (Fig. 1) are of increasing length and are downwardly rather than circumferentially displaced, to correspond to the outward flow of combustion gases. Similarly in the nozzle portion 52 of the combustion chamber the tubes 53 are inclined toward the outer end of the nozzle.

These tubes 53 in the nozzle portion are preferably mounted in two or more sections, separated by partitions 54, and supplied with liquid through pipes 55 which communicate with separate annular spaces 56 and 57. Water may be used as the cooling liquid in these nozzle sections, as inert combustion gases form the main flow through the nozzle 52. The liquid pressures in the spaces 56 and 57 may be separately varied to correspond to the diminishing gas pressure toward the open end of the nozzle.

A combustion chamber constructed as previously described is particularly well adapted for use in rockets, rocket planes or other aircraft, as the honeycomb structure, with the tubes secured together at the points of contact of their inner ends, possesses substantial rigidity and compressive strength and is well adapted to resist the inward pressure required to force the liquid oxygen through the tubes and openings and into the combustion chamber. This pressure may be considerable, as the expansion and partial vaporizing of the oxygen in the tubes has a marked retarding action on the flow of oxygen into and through the tubes and openings.

The inward enlargement of the tubes, as 25, 42 and 53, is provided to reduce the choking action due to expansion or vaporization of the oxygen, and also to reduce the speed at which the liquid or gas enters the combustion chamber.

It is also desirable that the diameter of the entrance portions of the tubes as 25, and of the openings, as 27, be graduated to correspond to the relative pressures in different parts of the combustion chamber. This pressure is highest in the hemispherical upper end portion, somewhat reduced in the cylindrical middle portion, and still further reduced in the lower portion of the combustion chamber and in the nozzle 52. It is desirable to have the diameters of the tubes and openings greater where the chamber pressure is high and relatively smaller where the pressure is less, as otherwise too little oxygen will be delivered in the high pressure areas and too much in the low pressure areas.

Figure 7:
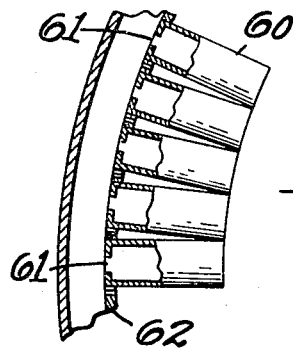
Figs. 7, 8 and 9 are partial sectional plan views, similar to Fig. 2 but showing modified constructions.
Figure 8:
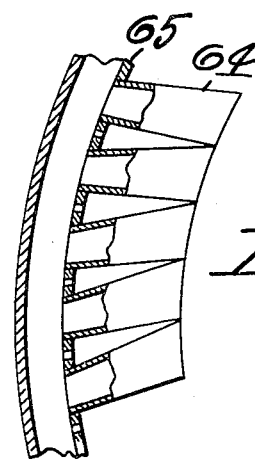
Figure 9:
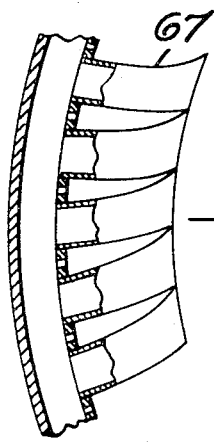

While the construction shown in Figs. 2 and 3 is very desirable, many of the advantages of my invention may be secured by use of one of the modified constructions shown in Figs. 7, 8 and 9.

In Fig. 7, the tubes 60 are radial and cylindrical but are provided with reduced openings 61 where they are secured to the inner casing 62.

In Fig. 8, the tubes 64 are conical throughout and are secured at an angle in the inner casing 65. This construction necessitates non-circular openings in the casing 65, which is somewhat of a disadvantage in construction.

In the construction shown in Fig. 9, the tubes 67 are substantially similar to the tubes 25 shown in Fig. 2, except that they are tapered and continuously curved throughout their length, instead of having a cylindrical portion and an offset tapering portion as in Fig. 2.

Figure 10:
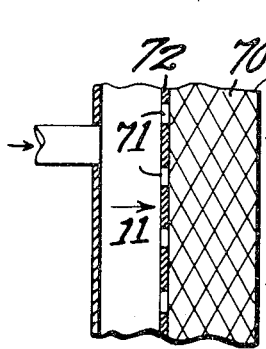
Fig. 10 is a partial sectional front elevation showing a further modification.
Figure 11:
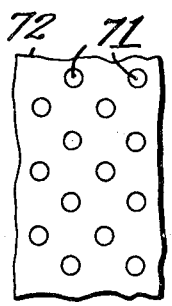
Fig. 11 is a side elevation, looking in the direction of the arrow 11 in Fig. 10.

Many of the advantages of my invention may also be secured by substituting a layer 70 (Fig. 10) of porous non-combustible material for the tubular honeycomb construction previously described. The expansion of the liquid oxygen as it flows through the porous structure has the same cooling effect as in the tubular form. Spaced openings 71 in the inner casing 72 communicate with the porous structure as in the previous forms.

Figure 12:
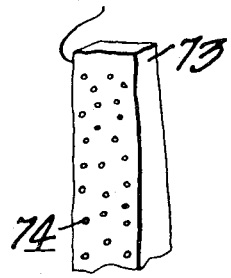
Fig. 12 is a perspective view of another modified construction.

If it is desired to vary the resistance to flow to offset differences in chamber pressure with this form of my invention, this may be accomplished by varing the thickness of the layer 70, as indicated at 73 in Fig. 12, or by providing spots 74 of non-porous material on one face of the layer, distributed to produce the desired graduated resistance.

Figure 13:
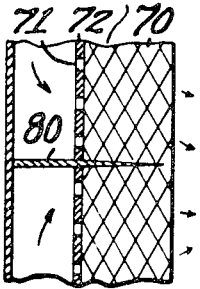
Fig. 13 is a detail sectional side elevation showing an addition to the structure shown in Fig. 10.

If it is desired to separate longitudinally adjacent portions of the porous layer 70, so that different liquids or different pressures may be supplied to different parts of the combustion chamber, partitions 80 (Fig. 13) may be inserted, corresponding in function to the partitions 54 previously described.

In all constructions, free spaces should be provided around the liquid supply pipes as indicated at 33 in Fig. 2 and 41 in Fig. 3, for purposes previously explained.

The term "porous" in the claims is to be understood as covering both the tubular structure and also the layer of porous material.

Having thus described certain forms of my invention and the advantages thereof, I do not wish to be limited to the details herein disclosed, otherwise than as set forth in the claims, but what I claim is:

1. A combustion chamber for rocket craft comprising spaced outer and inner sheet metal casings providing an elongated annular conductor for a liquid oxidizing element, said inner casing having feeding perforations therethrough, and a layer of porous material attached to said inner metal casing and supported on the inner face thereof and in the porosities of which said liquid oxidizing element is vaporized and thereafter delivered in gaseous form to said combustion chamber.

2. The combination in a combustion chamber as set forth in claim 1, in which the porous layer comprises a plurality of metal tubes inwardly directed.

3. The combination in a combustion chamber as set forth in claim 1, in which the porous layer comprises a plurality of metal tubes inwardly directed and inwardly enlarged.

4. The combination in a combustion chamber as set forth in claim 1, in which the porous layer comprises a plurality of metal tubes inwardly directed and offset in the direction of flow of a combustible constituent within said chamber.

5. The combination in a combustion chamber as set forth in claim 1, in which the porous layer comprises a plurality of cylindrical metal tubes inwardly directed and in which said tubes are inclined in the direction of flow of a combustible constituent within said chamber.

6. The combination in a combustion chamber as set forth in claim 1, in which the porous layer comprises a plurality of metal tubes inwardly directed and inwardly expanded and continuously curved in the direction of flow of a combustible constituent within said chamber.

7. The combination in a combustion chamber as set forth in claim 1, in which the porous layer comprises a plurality of metal tubes inwardly directed and having their inner ends contacting and secured together at spaced points on their peripheries.

8. The combination in a combustion chamber as set forth in claim 1, in which the porous layer comprises a plurality of metal tubes inwardly directed and having their inner ends contacting and secured together at spaced points on their peripheries and said inner casing having perforations communicating with said tubes and having additional holes communicating with the spaces between said tubes.

9. The combination in a combustion chamber as set forth in claim 1, in which the porous layer comprises a plurality of metal tubes inwardly directed and in which holes are provided in said inner casing which communicates with said tubes and with inwardly open spaces between said tubes.

10. The combination in a combustion chamber as set forth in claim 1, in which the porous layer comprises a plurality of metal tubes inwardly directed and in which a perforation in said casing communicates with each tube, said perforations being relatively proportioned in area to correspond to the relative operative pressures in associated parts of said combustion chamber.

11. The combination in a combustion chamber as set forth in claim 1, in which the porous layer comprises a metallic honeycomb structure with the pores thereof communicating with said perforations and open inwardly through said structure to said combustion chamber and inwardly enlarged.

12. A combustion chamber for rocket craft comprising spaced outer and inner sheet metal casings providing an elongated annular conductor for a liquid oxidizing element, said inner casing having feeding perforations therethrough, a layer of porous material attached to said inner metal casing and supported on the inner face thereof and in the porosities of which said liquid oxidizing element is vaporized and thereafter delivered in gaseous form to said combustion chamber, means to separate different portions of said annular conductor and of said porous material, and means to supply said liquid oxidizing element to said separated portions of said conductor and of said porous material under different selected pressures.

13. The combination in a combustion chamber as set forth in claim 12, in which said separating means includes non-porous partitions extending inward from said inner metal casing and substantially through said porous material.

14. The combination in a combustion chamber as set forth in claim 12, in which said separating means comprises non-porous partitions extending inward from said inner casing and substantially through said porous material and associated separating partitions between said outer and inner metal casings which divide the space between said casings into successive annular liquid-conducting compartments.

15. A combustion chamber for rocket craft comprising spaced outer and inner sheet metal casings providing an elongated annular conductor for a liquid oxidizing element, said inner casing having feeding perforations therethrough, and a layer of porous material attached to said inner metal casing and supported on the inner face thereof and in the porosites of which said liquid oxidizing element is vaporized and thereafter delivered in gaseous form to said combustion chamber, said porous layer being varied in thickness inversely to the operative pressures in said chamber.

16. A combustion chamber for rocket craft comprising spaced outer and inner casings, said inner casing being perforated, and a layer of porous material supported on the inner face of said inner casing and through which a liquid oxidizing constituent may be delivered to said chamber, portions of said porous layer being spotted with non-porous material to reduce the porosity thereof inversely to the operative pressures in said chamber.

17. A combustion chamber having an outer liquid supply space and having an inner chamber wall of metallic honeycomb structure comprising a multiplicity of small inwardly open tubes with restricted spaces between said tubes, and said wall having separate openings from said liquid supply space to said tubes and to said spaces.

18. A combustion chamber for rocket craft comprising spaced outer and inner sheet metal casings providing an elongated annular conductor for a liquid oxidizing element, said inner casing having feeding perforations therethrough, a layer of porous material attached to said inner metal casing and supported on the inner face thereof and in the porosities of which said liquid oxidizing element is vaporized and thereafter delivered in gaseous form to said combustion chamber, and nozzles extending through said porous material to supply a combustible constituent to said chamber, said nozzles being spaced from said porous material to prevent freezing of said combustible constituent.

ROBERT H. GODDARD.